US011208882B2

(12) United States Patent
Chen

(10) Patent No.: US 11,208,882 B2
(45) Date of Patent: Dec. 28, 2021

(54) ROTATION MONITORING WITH MAGNETIC FILM

(71) Applicant: Halliburton Energy Services, Inc., Houston, TX (US)

(72) Inventor: Hau Jiun Chen, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 89 days.

(21) Appl. No.: 16/610,419

(22) PCT Filed: Jun. 2, 2017

(86) PCT No.: PCT/US2017/035780
§ 371 (c)(1),
(2) Date: Nov. 1, 2019

(87) PCT Pub. No.: WO2018/222210
PCT Pub. Date: Dec. 6, 2018

(65) Prior Publication Data
US 2020/0056472 A1  Feb. 20, 2020

(51) Int. Cl.
*E21B 4/02* (2006.01)
*E21B 47/00* (2012.01)
(Continued)

(52) U.S. Cl.
CPC .............. *E21B 47/00* (2013.01); *E21B 4/02* (2013.01); *G01D 5/245* (2013.01); *E21B 47/12* (2013.01)

(58) Field of Classification Search
CPC ........................................................ E21B 4/02
See application file for complete search history.

(56) References Cited

U.S. PATENT DOCUMENTS

| 4,263,525 A | 4/1981 | Lathlaen |
| 4,502,853 A | 3/1985 | Ohi |
(Continued)

FOREIGN PATENT DOCUMENTS

| EP | 0484716 A1 | 5/1992 |
| GB | 2507200 A | 4/2014 |
(Continued)

OTHER PUBLICATIONS

Wikipedia enger for Wiegand effect retrived from https://web.archive.org/web/20150818114004/https://en.wikipedia.org/wiki/Wiegand_effect last mdifed on Jul. 21, 2015. (Year: 2015).*
(Continued)

*Primary Examiner* — Giovanna Wright
(74) *Attorney, Agent, or Firm* — Benjamin Ford; Baker Botts L.L.P.

(57) ABSTRACT

Providing accurate speed and rotation of a motor of a drilling assembly allows accurate monitoring of a drilling operation, for example, direction of drilling, rate of penetration, vibration, and stability of the drilling assembly. A bi-stable magnetic device is used to provide better control of torque and rate of penetration and prevention of slip-stick issues. One such device is a downhole motor that includes a stator and a rotor with a magnetic blade. The magnetic blade includes at least one of a magnetic edge, a magnetic surface, and a magnetic core, or is entirely or partially magnetic. A sensor is positioned in the stator to detect the passing of the magnetic edge of the blade of the rotor. Detection of one or more magnetic blades may provide rotational speed or other status information of the drilling assembly.

20 Claims, 6 Drawing Sheets

(51) Int. Cl.
*G01D 5/245* (2006.01)
*E21B 47/12* (2012.01)

(56) References Cited

U.S. PATENT DOCUMENTS

| | | | |
|---|---|---|---|
| 4,536,708 | A | 8/1985 | Schneider |
| 4,639,670 | A | 1/1987 | Normann |
| 5,433,118 | A | 7/1995 | Castillo |
| 6,191,687 | B1 | 2/2001 | Dlugos et al. |
| 6,481,296 | B2 | 11/2002 | Jin et al. |
| 6,604,434 | B1 | 8/2003 | Hamilton et al. |
| 2003/0020353 | A1 | 1/2003 | Lopatinsky et al. |
| 2003/0036695 | A1 | 2/2003 | Govari |
| 2009/0039872 | A1 | 2/2009 | Fischer |
| 2012/0139250 | A1 | 6/2012 | Inman et al. |
| 2014/0027174 | A1 | 1/2014 | Ringer et al. |
| 2014/0028293 | A1 | 1/2014 | Johnson et al. |
| 2015/0047911 | A1* | 2/2015 | Burhan .............. E21B 10/32 175/337 |
| 2015/0060141 | A1* | 3/2015 | Leuenberger ........ E21B 44/00 175/40 |
| 2015/0167466 | A1* | 6/2015 | Teodorescu ......... G01M 15/14 175/40 |

FOREIGN PATENT DOCUMENTS

| | | | |
|---|---|---|---|
| JP | 57175913 | A | 10/1982 |
| JP | 57175919 | A | 10/1982 |
| JP | 57175920 | A | 10/1982 |
| KR | 20090125310 | A | 12/2009 |
| WO | 2009/052887 | A1 | 4/2009 |
| WO | 2013/174469 | A2 | 11/2013 |
| WO | 2014/031108 | A1 | 2/2014 |
| WO | 2014/052227 | A1 | 4/2014 |
| WO | 2015/196278 | A1 | 12/2015 |

OTHER PUBLICATIONS

Pepperl+Fuchs, "Precision is Redefined—The New Magnetic Rotary Encoders Impress with the Highest Measurement Accuracies" found at https://www.pepperl-fuchs.com/global/en/23672.htm, 1 page.
International Search Report and Written Opinion issued in related PCT Application No. PCT/US2017/035780 dated Feb. 12, 2018, 15 pages.
Gieras, Izabella A., and Jacek F. Gieras. "Recent advancements in permanent magnet motors technology for medical applications." Prace Instytutu Elektrotechniki 229 (2006): 7-20.
Gayen, Anabil, et al. "High temperature magnetic properties of indirect exchange spring FePt/M (Cu, C)/Fe trilayer thin films." Journal of Nanomaterials 2013 (2013).
Wikipedia Entry for "Wiegand effect" found at https://en.wikipedia.org/wiki/Wiegand_effect, accessed on Sep. 10, 2019, 3 pages.
Fleming, William J. "Overview of automotive sensors." IEEE sensors journal 1.4 (2001): 296-308.
Lee, Dasheng. "Wireless and powerless sensing node system developed for monitoring motors." Sensors 8.8 (2008): 5005-5022.
Shima, T., et al. "Coercivity exceeding 100 kOe in epitaxially grown FePt sputtered films." Applied Physics Letters 85.13 (2004): 2571-2573.
Zhukova, Valentina, Mihail Ipatov, and Arcady Zhukov. "Thin magnetically soft wires for magnetic microsensors." Sensors 9.11 (2009): 9216-9240.
Rauscher, Gerd, and Christian Radeloff. "Wiegand and Pulse-Wire Sensors." Sensors: Magnetic Sensors 5 (1989): 315-339.
Mohri, K., S. Takeuchi, and T. Fujimoto. "Sensitive magnetic sensors using amorphous wiegand-type ribbons." IEEE Transactions on Magnetics 17.6 (1981): 3370-3372.
Dlugos, David J. "Wiegand effect sensors: Theory and applications." Sensors—the Journal of Applied Sensing Technology 15.5 (1998): 32-34.
Sensor Business Digest, "Wiegand Effect Sensors Have Potential to Help Drive Diverse Applications", Jun. 2002, 4 pages.

* cited by examiner

ROTATION MONITORING WITH MAGNETIC FILM

CROSS-REFERENCE TO RELATED APPLICATION

The present application is a U.S. National Stage Application of International Application No. PCT/US2017/035780 filed Jun. 2, 2017, which is incorporated herein by reference in its entirety for all purposes.

BACKGROUND

The present disclosure relates generally to well drilling operations and, more particularly, to monitoring and detecting the status of a drilling operation.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

During a wellbore drilling operation, it is typically desirable to monitor the status of the drilling system. For example, such status information may include rotational speed of the drill bit, the location of the drill bit within the formation, and other drilling environmental properties. Monitoring and controlling these parameters may be important to accurately control the direction of the drill bit, and control the location of the resulting wellbore. As a result, an apparatus and system for measuring the rotational speed of the drill bit during a drilling operation is desirable.

FIGURES

Some specific exemplary embodiments of the disclosure may be understood by referring, in part, to the following description and the accompanying drawings.

Figure 1:
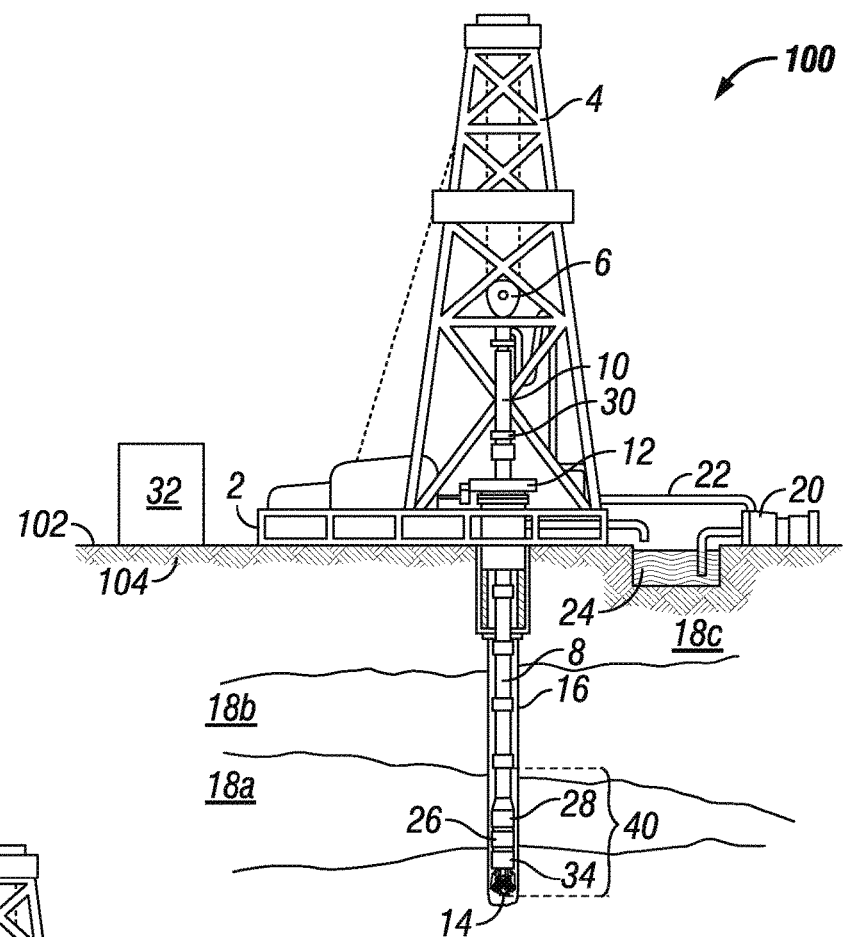
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to monitoring and detecting the status of a drilling operation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), flash memory; as well as communications media such wires, optical fibers, microwaves, radio waves, and other electromagnetic and optical carriers; or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Exploration of hydrocarbons may require that data and information regarding downhole parameters and conditions be communicated to the surface. For example, rotational speed, tool face and location of the drill bit, earth formation parameters, drilling environmental parameters, and other status information may be obtained from downhole tools, sensors, or other equipment. Precise control of all parameters associated with drilling are critical to manipulate the one or more hydrocarbon operations such that the drilling assembly or system is steered to the target location quickly and safely. The speed and rotation of the motor associated with the drilling system is important for controlling, for example, the direction of drilling, rate of penetration, and vibration and stability of the drilling system. Poor control over the drilling system may result in extra costs such as time and resources. Using bi-stable magnetic devices to detect the rotational speed using permanent magnets fabricated to the rotor blades of a motor provides for better control of torque, rate of penetration, and prevention of issues such as slip-stick.

FIG. 1 is a diagram of a subterranean drilling system 100, according to aspects of the present disclosure. The drilling system 100 comprises a drilling platform 2 positioned at the surface 102. In the embodiment shown, the surface 102 comprises the top of a formation 104 containing one or more rock strata or layers 18a-c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as the drill string 8 is lowered through a rotary table 12. A drill bit 14 may be coupled to the drill string 8 and driven by a downhole motor 26 or rotation of the drill string 8 by the rotary table 12. As bit 14 rotates, a borehole 16 passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise a tool or bottom hole assembly (BHA) 40 coupled to the drill string 8 near the drill bit 14. The BHA 40 may comprise the downhole motor 26, and various downhole measurement tools and sensors and LWD and MWD elements. The downhole motor 26 may comprise at least one transmitter and receiver capable of communicating with adjacent or proximate tool electronics located on the drill string 8. The orientation and position of the drill bit 14 and the downhole motor 26 may be tracked using, for example, an azimuthal orientation indicator which may include magnetometers, inclinometers, accelerometers, or any combination thereof, though other sensor types such as gyroscopes may be used in some embodiments. The downhole motor 26 may comprise a turbine motor, as will be described below.

The downhole motor 26 may also include a control unit (not shown) coupled to transmitters and receivers that control operation of the transmitters and receivers, stores measurements, and in certain instances measures and processes rotation measurements from the downhole motor 26. Example control units may include an information handling system, microcontrollers, microcomputers and any other device that contains at least one processor communicably coupled to one or more memory devices containing a set of instructions that when executed by the processor, cause the processor to perform certain actions. A control unit of the downhole motor 26 may be communicably coupled to other controllers within the BHA 40.

The BHA 40 may also include a steering tool 34 that controls the direction of the drill bit 14 and, therefore, the direction in which the borehole 16 will be drilled. Example steering tools include point-the-bit and push-the-bit type systems. One use of the steering tool 34 is to direct the drill bit 14 and borehole 16 to one of the formation strata 18a-c that contains hydrocarbons. Other uses include avoiding certain undesired strata or formation bodies, following existing borehole, maintaining a distance from an adjacent wellbore, or intersecting existing borehole to drill relief wells in the case of a blowout. The steering tool 34 may include a separate control unit (not shown) that controls the operation of the steering tool 34. The control unit may be communicably coupled to other controllers within the BHA 40, such as a control unit within the downhole motor 26, and may alter its operation depending on measurements or signals received from the other controllers.

The tools and sensors of the BHA 40 including the downhole motor 26 may be communicably coupled to a telemetry element 28. The telemetry element 28 may transfer measurements from the downhole motor 26 to a surface receiver 30 or receive commands from the surface receiver 30. The telemetry element 28 may comprise a mud pulse telemetry system, acoustic telemetry system, wired communications system, wireless communications system, or any other type of communications system that would be appreciated by one of ordinary skill in the art in view of this disclosure. Some or all of the measurements taken at the downhole motor 26 may also be stored within the downhole motor 26 or the telemetry element 28 for later retrieval at the surface 102.

The drilling system 100 may comprise an information handling system 32 positioned at the surface 102. The information handling system 32 may be communicably coupled to the surface receiver 30 and may receive measurements from the downhole motor 26 or transmit commands to the downhole motor 26 though the surface receiver 30. The information handling system 32 may also receive measurements from the downhole motor 26, when retrieved at the surface 102. As will be described below, the information handling system 32 may process the magnetic field measurements or azimuthal orientation to determine a distance from and direction of the magnetic field generating object.

Figure 2:
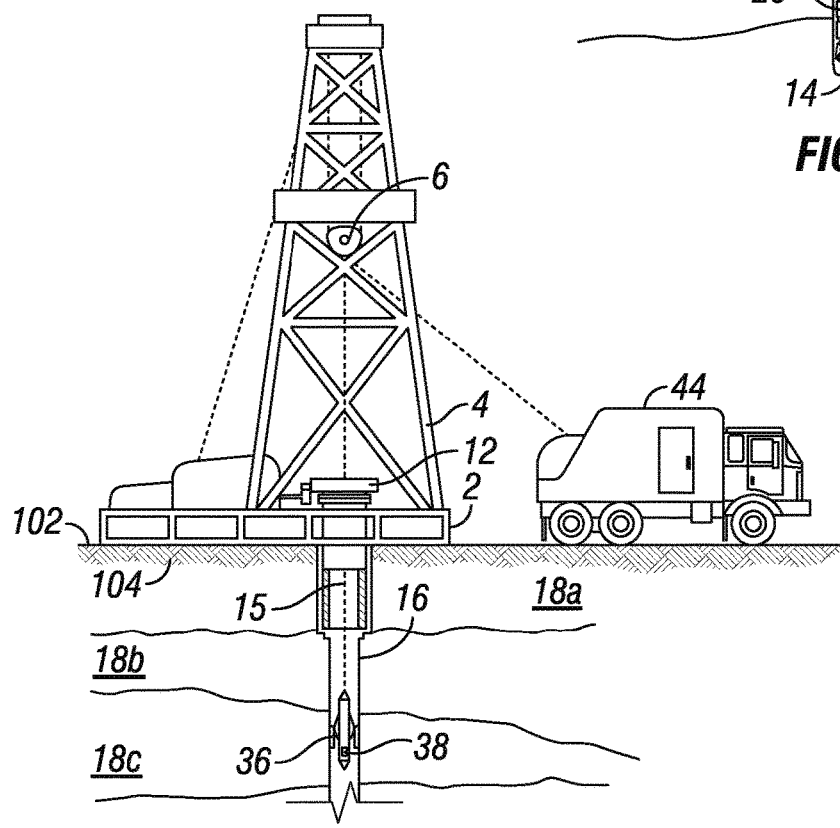
FIG. 2 is a diagram showing an illustrative wireline measurement system, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 36, i.e., an instrument that is suspended into the borehole 16 by a cable 15 having conductors for transporting power to the tool and telemetry from the tool body to the surface 102. A logging facility 44 (shown in FIG. 2 as a truck, although the logging facility 44 may be any other structure) may collect measurements from the wireline tool 36, and may include computing facilities (including, e.g., a control unit) for controlling, processing, storing, or visualizing the measurements gathered by the wireline tool 36. The computing facilities may be communicatively coupled to a receiver 38 of the wireline tool 36 by way of the cable 15. The information handling system 32 may serve as the computing facilities of the logging facility 44.

The present disclosure discloses a drilling system comprising a sensor used to measure one or more downhole drilling parameters. For example, the drilling system may allow measurement of rotation speed (RPM) of a rotor connected to a drill bit.

Figure 3:
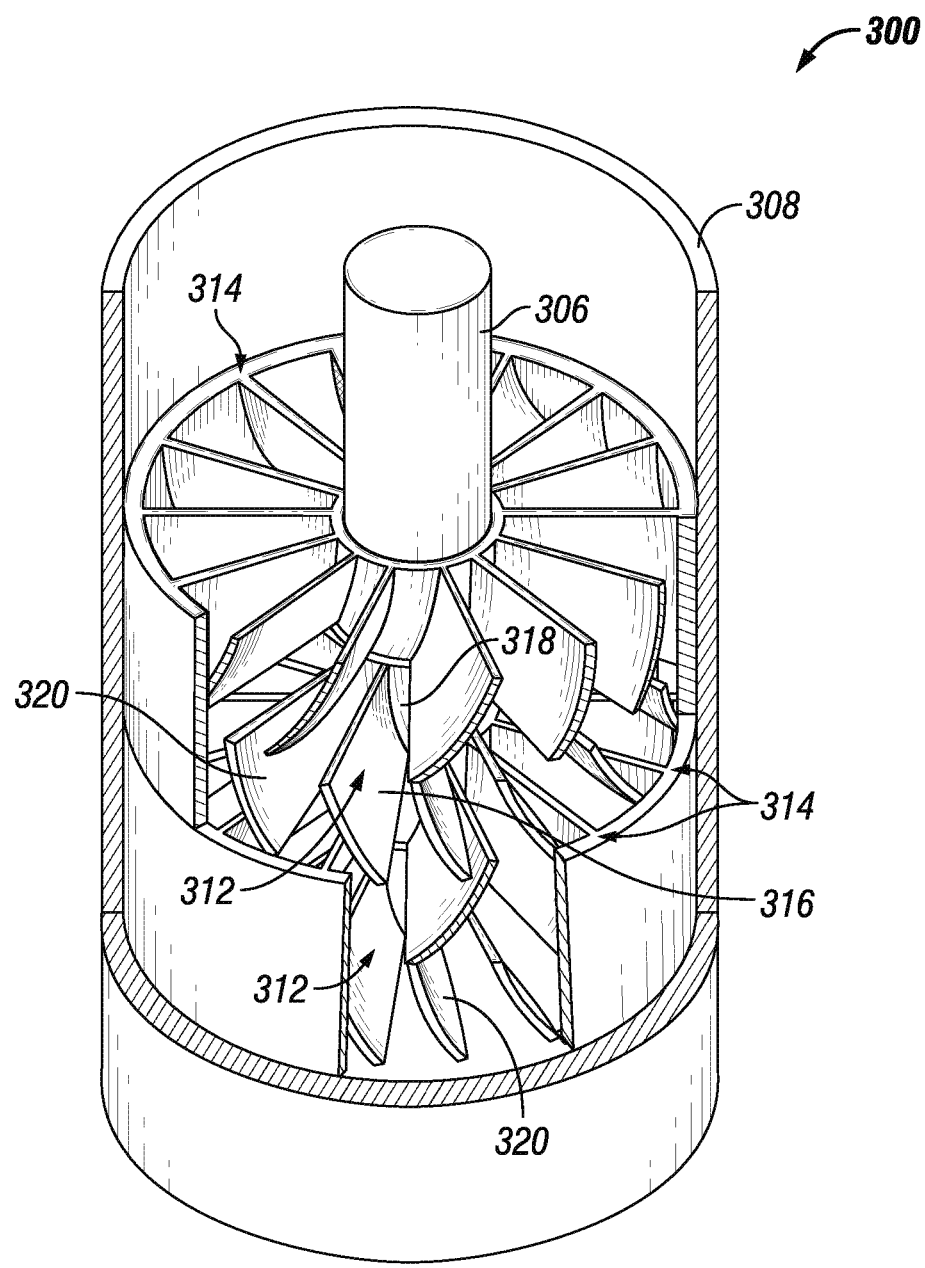
FIG. 3 is a diagram showing an illustrative downhole motor system, according to aspects of the present disclosure.

Referring now to FIG. 3, a downhole motor 300 is shown within a drill string 308. The downhole motor 300 may comprise at least one rotor 312 and at least one stator 314. The at least one rotor 312 may be rotatably disposed within the stator 314. The at least one rotor 312 may be connected to a drive shaft 306. The rotor 312 may be structured and arranged to apply torque to the drive shaft 306 capable of rotating the drive shaft 306 relative to the drill string 308. The drive shaft 306 may be connected to a drill bit wherein rotation of the drive shaft 306 may apply torque to the drill bit causing the drill bit to rotate.

The rotor 312 may comprise a plurality of blades 320. The rotor 312 may comprise a center portion 318 disposed or positioned circumferentially about drive shaft 306. The rotor 312 may comprise a single manufactured piece, such that each of the blades 320 comprises a member extending from the center portion 318 of the rotor 312. The rotor 312 may comprise at least one magnetic blade 316. In one or more embodiments, the magnetic blade 316 comprises at least one of a magnetic edge, a magnetic surface, and a magnetic core, or is otherwise entirely or partially magnetic.

Figure 4A:
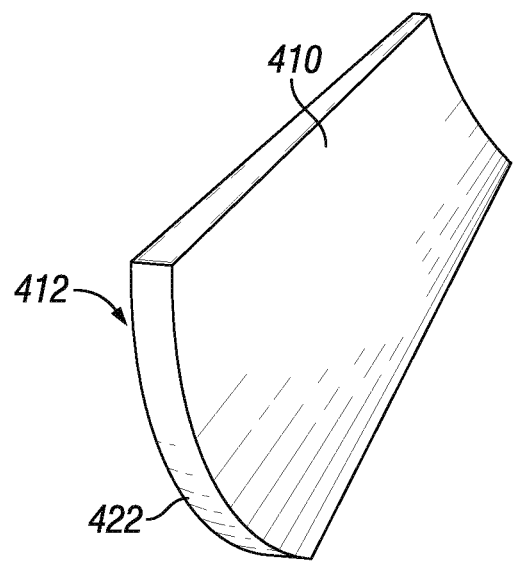
FIG. 4A is a diagram of a magnetic rotor blade, according to aspects of the present disclosure.
Figure 4B:
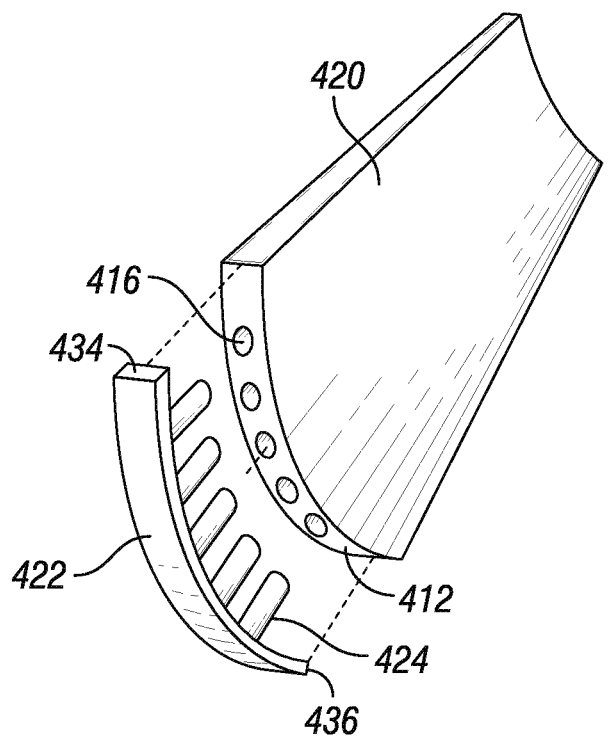
FIG. 4B is an exploded view of a magnetic rotor blade, according to aspects of the present disclosure.

Referring now to FIGS. 4A and 4B, an embodiment of a magnetic blade 410 of a rotor, for example, rotor 312 of FIG. 3, is shown. A magnetic blade 410 may comprise blade 320. In one or more embodiments, magnetic blade 410 may comprise a magnetic film 422. FIG. 4A shows an embodiment of the magnetic blade 410 comprising a blade edge 412. The blade edge 412 may extend radially outward from the center portion 318 of the rotor 312 as depicted in FIG. 3. The blade edge 412 may comprise a fabricated magnetic film 422 attached, connected, or coupled to the blade edge 412. In addition to the blade edge 412, the magnetic blade 410 may further comprise any known material used in rotor blades, for example, aluminum, composite material, steel, titanium, any other material, or any combination thereof.

For illustration purposes, FIG. 4B shows an embodiment of a magnetic blade 420, where the magnetic film 422 attached to the blade edge 412 is shown in an exploded view. The magnetic film 422 may be applied using any method known to one of ordinary skill in the art with the benefit of the present disclosure. In one or more embodiments, the magnetic film 422 may be applied to the blade edge 412 using a sputtering technique to grow the magnetic film 422 directly on the blade edge 412. In one or more embodiments, the blade edge 412 may comprise a plurality of pits 416 disposed on, along, or about the magnetic edge 412. The pits 416 may strengthen attachment of the magnetic film 422 to the blade edge 412. In one or more embodiments, the magnetic film 422 may comprise a corresponding plurality of rods 424 to the pits 416. The rods 424 of the magnetic film 422 may align with and connect, engage, attach, couple to, or otherwise be insertable into the plurality of pits 416 of the blade edge 412. The pits 416 may be positioned in a pattern, evenly spaced, or scattered randomly on the blade edge 412. In one or more embodiments, the pits 416 may have a depth range from 5 nanometers (nm) to 5 centimeters (cm). The pits 416 may have a substantially uniform depth or may have varied depths. Alternatively, in one or more embodiments the blade edge 412 may not comprise any pits, and the blade 420 may be attached, connected, or coupled to the magnetic film 422 by an adhesive. In one or more embodiments, the adhesive may be applied using a seeded sputtering method or any other method known to one of ordinary skill in the art for adhering the blade 420 to the magnetic film 422.

It should be noted that the magnetic film 422 is shown in an exaggerated size in FIG. 4B, for example, an exaggerated side width 434 and base width 436. The present invention contemplates that the magnetic film 422 may have any dimension suitable for a given operation. In one or more embodiments, the magnetic film 422 may have a thickness of less than 20 nm, less than 10 nm, between 1 nm to 10 nm, or any other suitable thickness. The magnetic film 422 may comprise one or more magnetic materials. For example, the magnetic film 422 may comprise any iron-platinum, iron-chromium, nickel-chromium ferrites, iron oxides, samarium-iron-nickel, and any other variations of materials that may be sputtered to make a magnetic thin film or any combination thereof.

The magnetic edge 412 of a blade 420 or a blade 410 may be operational in downhole drilling conditions. For example, the magnetic field strength of magnetic edge 412 may withstand temperatures of from −100° C. to 350° C.

The magnetic film 422 may be associated with a positive or a negative magnetic polarity, for example, a positive-polarity magnetic film or a negative-polarity magnetic film.

In addition, the rotor, for example, rotor 312 in FIG. 3, may comprise a plurality of magnetic blades 410 or 420. In embodiments containing a plurality of magnetic blades 410 or 420, each magnetic blade 410 or 420 may comprise a magnetic film 422 associated with a positive magnetic polarity or a magnetic film 422 associated with a negative magnetic polarity. For example, in an embodiment comprising two magnetic blades 420, both magnetic films 422 of the magnetic blades 420 may have a positive magnetic polarity, both magnetic films 422 of the magnetic blades 420 may have a negative magnetic polarity, or one magnetic film 422 of a first magnetic blade 420 may have a positive magnetic polarity and one magnetic film 422 of a second magnetic blade 420 may have a negative magnetic polarity. It will be understood that many combinations and arrangements of magnetic polarities may be used. The present disclosure does not intend to be limited to particular combinations or arrangements of positive and negative polarities of the magnetic films 422.

Figure 5:
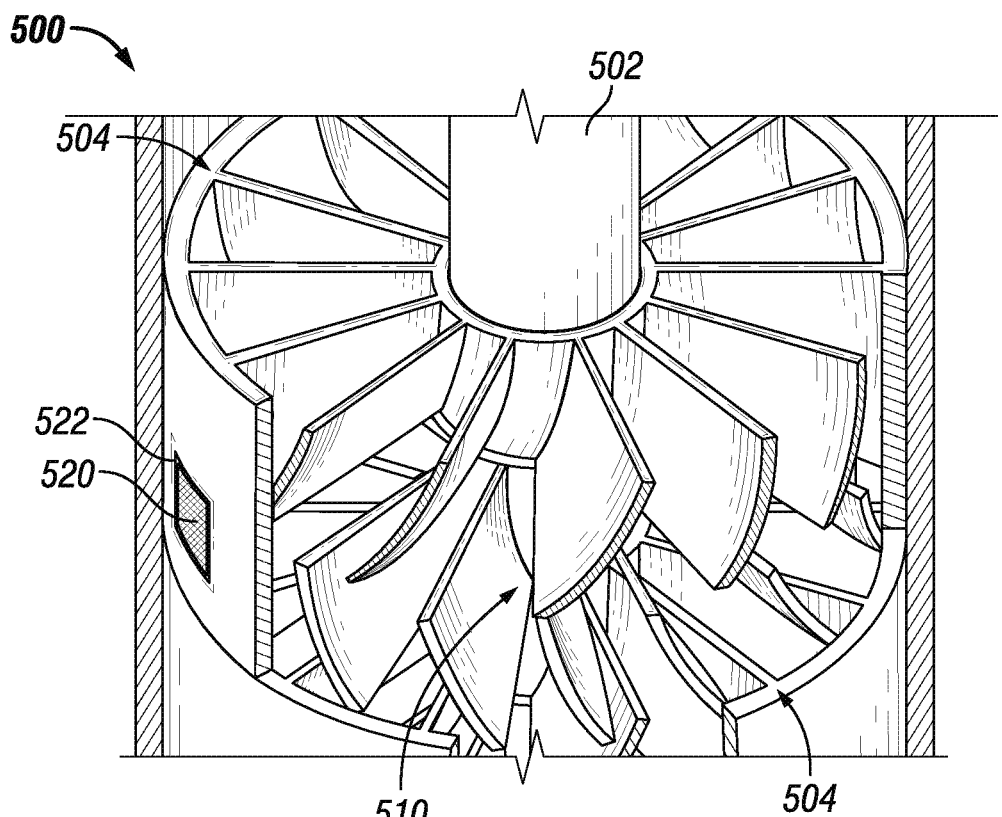
FIG. 5 is a diagram of a downhole motor system, according to aspects of the present disclosure.

Referring now to FIG. 5, a downhole motor 500 is shown comprising a stator 504, a rotor 510 disposed within the stator 504 and a drive shaft 502 connected to the rotor 510. The downhole motor 500 may further comprise a sensor 520 positioned or disposed within a sensor opening 522 within the stator 504 and adjacent to the rotor 510.

Figure 6:
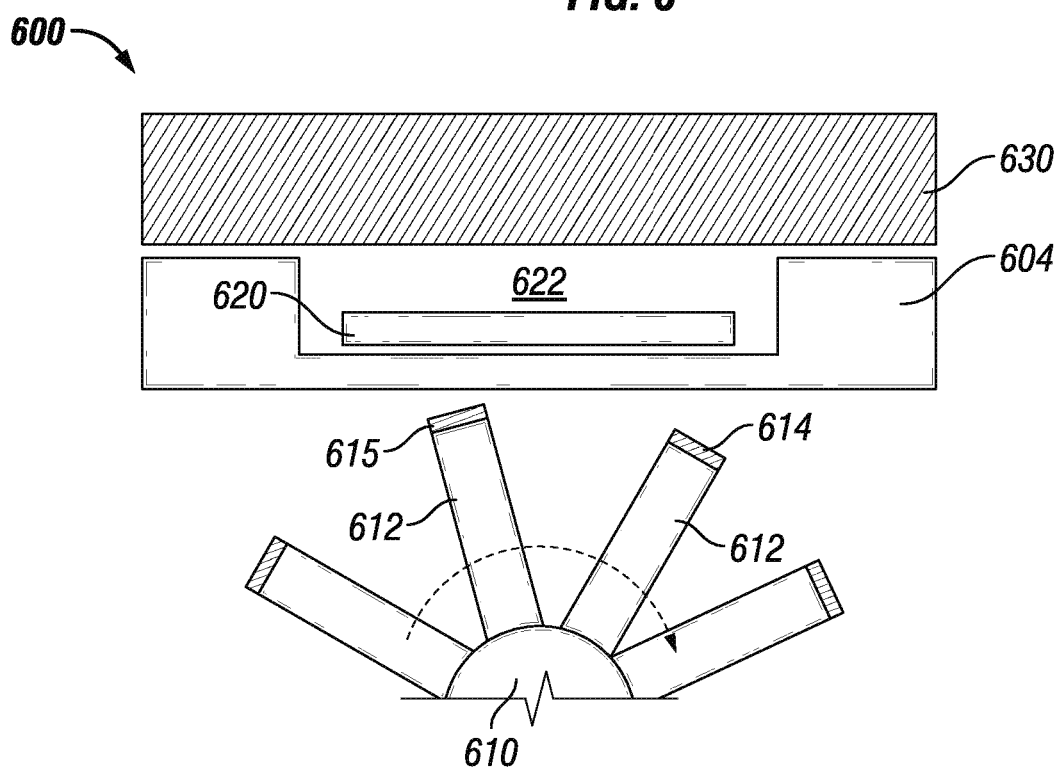
FIG. 6 is a diagram of a sensor enclosed within a stator, according to aspects of the present disclosure.

FIG. 6 shows an above, cross-sectional view of the downhole motor 600. A rotor 610 comprising a plurality of blades 612 may be disposed within a stator 604. A sensor 620 may be disposed within a sensor opening 622 located, positioned, or disposed within the stator 604 and adjacent to the rotor 610. A collar 630 may be disposed outside of the stator 604 such that the sensor 620 is contained between the stator 604 and the collar 630. At least one of the plurality of blades 612 may comprise a first magnetic edge 614 and at least one of the plurality of blades 612 may comprise a second magnetic edge 615. The first magnetic edge 614 may have a first polarity. As the rotor 610 rotates within the stator 604, each of the plurality of blades 612 may pass into proximity with the sensor 620, and then out of proximity with the sensor 620. For example, the first magnetic edge 614 of a rotor blade 612 may pass within a predetermined or specified distance, for example, 1 micrometer (µm), of the sensor 620. The first magnetic edge 614 of a rotor blade 612 may pass by the sensor 620 as the rotor blade 612 rotates within the stator 604.

The sensor 620 may be disposed, positioned, structured, or arranged to detect passing of the first magnetic edge 614 by the sensor 620. The sensor 620 may generate an electric signal in response to reversal of a magnetic field at the sensor 620. For example, the sensor 620 may generate a signal in response to being in a predetermined distance or proximity to the first magnetic edge 614.

The system may comprise a second magnetic edge 615. The second magnetic edge 615 may have an opposite polarity, an opposite charge or both as compared to the first magnetic edge 614. When the second magnetic edge 615 moves into proximity with the sensor 620, the sensor 620 may reverse polarity, causing a Barkhausen jump and generating a voltage signal.

Figure 7:
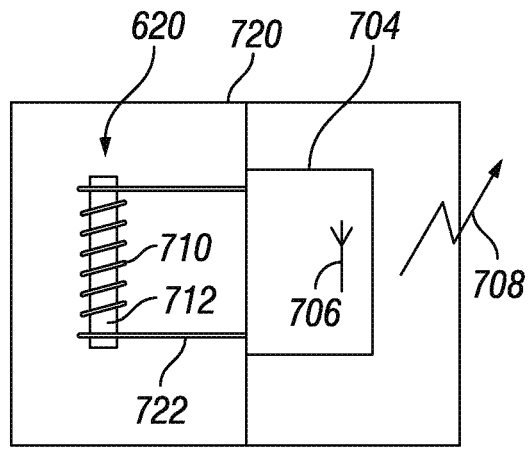
FIG. 7 is a diagram of a sensor and sensor circuitry assembly, according to aspects of the present disclosure.

Referring now to FIG. 7, the sensor 620 may be electrically connected to a sensor circuit 704. The sensor 620 may be electrically connected to the sensor circuit 704 via at least one wire. The sensor 620 may be electrically connected to the sensor circuit 704 by a motor casing 720 (for example, the sensor circuit 704 may receive signals generated by the sensor 620 through the motor casing 720) or may be directly coupled to the sensor circuit 704 via a connection 722 (for example, wire 710).

The sensor circuit 704 may be structured and arranged to detect and receive the electrical signal generated by the sensor 620. The sensor circuit 704 may be capable of or configured for receiving, storing, processing, and transmitting sensor information received from the sensor 620. As such, as would be understood by one of ordinary skill in the art with the benefit of the present disclosure, the sensor circuit 704 may comprise a processor, a controller, a memory, a storage or any combination thereof. The sensor circuit 704 may comprise an antenna 706 capable of sending signals, transmitting sensor information received from the sensor 620 or both. For example, the antenna 706 may transmit sensor information to a downhole tool or a surface receiver. In addition, the antenna 706 may be capable of receiving information (such as control information).

The sensor 620 may comprise a bi-stability sensor. For example, the sensor 620 may comprise a Wiegand effect sensor or a bi-stable magnetic device. The sensor may comprise a Wiegand wire 710 coiled around a Wiegand-wire core 712. The Wiegand wire 710 may comprise an annealed and hardened ferromagnetic wire. For example, the Wiegand wire 710 may comprise a ferromagnetic alloy, for example, cobalt, iron, vanadium, or any other ferromagnetic alloy. The Wiegand wire 710 may exhibit a large magnetic hysteresis. As such, the magnetic field of the Wiegand wire 710 may align with a magnetic field acting on the Wiegand wire 710. For example, the polarity of the Wiegand wire 710 may be reversed by reversing the polarity of the magnetic field acting on the Wiegand wire 710. The magnetization of the Wiegand wire 710 may continue to be aligned with the magnetic field even after the magnetic field is removed.

When the magnetization of the Wiegand wire 710 is reversed (i.e., the polarity is reversed), the Wiegand wire 710 may generate a signal voltage. The generated signal voltage may be sent to the sensor circuit 704. Sensor circuit 704 may comprise a transmitter, for example, an antenna 706. In response to receiving the signal voltage, the sensor circuit 704 may transmit a sensor signal 708 via the antenna 706. The sensor signal 708 may be received by a receiver, for example, a receiver on a downhole tool (for example, receiver 38 of wireline tool 36 of FIG. 2) or a receiver at the surface (for example, receiver 30 of FIG. 1). As such, the sensor signal 708 may comprise sensor information. In one or more embodiments, sensor signal 708 may be used to determine one or more rotor properties, such as speed and rotation of the rotor, for example, rotor 312 of FIG. 3.

The Wiegand-wire core 712 may increase the signal voltage generated when the magnetic field of the Wiegand wire 710 is reversed. For example, the Wiegand-wire core 712 may increase the generated signal voltage by from 100 to 1000 times as compared to the signal voltage generated without the Wiegand-wire core 712.

The sensor 620 may generate the signal voltage and transmit the sensor signal 708 without using external power. For example, the only electric power used by the sensor 620, sensor circuit 704, and the antenna 706 may be generated or supplied by reversing the magnetization of the sensor 620 (for example, by passing the magnetic edge of a rotor blade into proximity with the sensor 620).

The sensor 620 may generate a signal voltage independent of the rotor speed. For example, the sensor 620 may generate a voltage pulse wave at the instant the magnetization of the sensor 620 is reversed, where the curve of the voltage pulse wave is independent of the rotor speed. The sensor may generate and transmit a signal associated with the voltage pulse wave. The sensor 620 may generate a distinct sensor signal at any rotor speed.

Figure 8A:
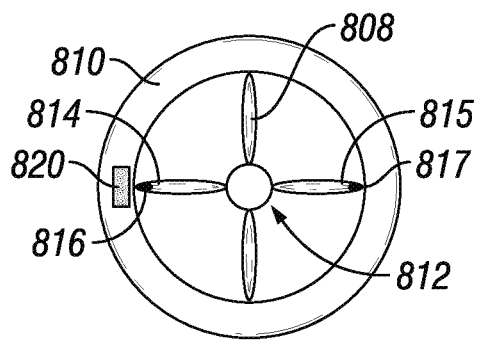
FIG. 8A is a diagram of a rotor and stator configuration comprising two magnetic blades and one sensor, according to aspects of the present disclosure.
Figure 8B:
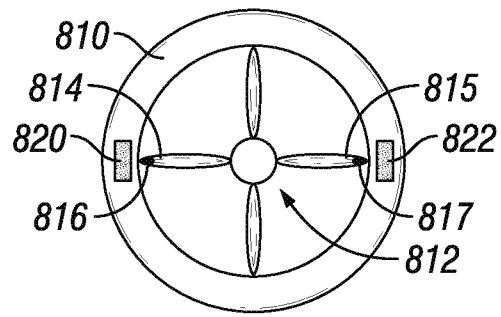
FIG. 8B is a diagram of a rotor and stator configuration comprising two magnetic blades and two sensors, according to aspects of the present disclosure.
Figure 8C:
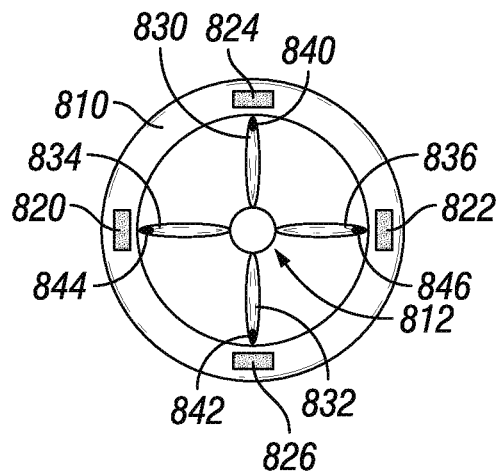
FIG. 8C is a diagram of a rotor and stator configuration comprising four magnetic blades and four sensors, according to aspects of the present disclosure.

Referring now to FIGS. 8A-8C, several embodiments of the system are shown comprising a rotor 812 disposed within a stator 810, and a first sensor 820 enclosed within the stator 810 and disposed proximate to the rotor 812. While the system is shown in several configurations for illustration purposes, the present disclosure comprehends many possible configurations of the system and does not intend to be limited to a particular configuration.

FIG. 8A shows an embodiment wherein the rotor 812 comprises a first magnetic blade 814 having a first magnetic edge 816 and a second magnetic blade 815 having a second magnetic edge 817. The first magnetic edge 816 and second magnetic edge 817 may have opposing polarities. The rotor 812 may comprise at least one non-magnetic blade 808. When the first magnetic blade 814 is rotated by the first sensor 810 the first magnetic edge 816 may exert a first magnetic field on the sensor 820. After the first magnetic blade 814 rotates past, the first sensor 820 may have a magnetization substantially aligned with that of the first magnetic edge 816. When the second magnetic blade 815 is rotated by the first sensor 820 the second magnetic edge 816 may exert a second magnetic field on the sensor 820 and induce the sensor 820 to reverse polarity, causing the sensor to generate a voltage signal.

A second sensor 822 may be enclosed within the stator 810, as shown in FIG. 8B. The second sensor 822 may be spaced apart radially from the first sensor 820 by any distance, for example, by or at least 45 degrees. For example, as shown in FIG. 8B, the second sensor 822 may be disposed opposite the first sensor 820. The first and second magnetic blade 814, 815 may also be disposed opposite each other on the rotor 812. With both the first and second sensor 820, 822 radially opposite each other and the first and second magnetic blade 814, 815 radially opposite each other, the polarization of both sensors 820, 822 may be reversed at substantially the same time. As such, the generated signal of the second sensor 822 may be used as a redundant check for errors in the measurement system. In addition, the redundant sensor configuration may allow the measurement system to continue operating after a sensor malfunctions or a magnetic edge loses magnetization.

FIG. 8C shows an embodiment comprising four magnetic blades: a first and second positive-polarity magnetic blade 830, 832 and a first and second negative-polarity magnetic blade 834, 836. For illustration purposes, the rotor 812 is shown without non-magnetic blades. The first and second positive-polarity magnetic blades 830, 832 may comprise a first and second positive-polarity magnetic edge 840, 842, respectively. The first and second negative-polarity magnetic blades 834, 836 may comprise a first and second negative-polarity magnetic edge 844, 846, respectively.

The positive-polarity magnetic edges 840, 842 may have an opposite polarity as compared to the first and second negative-polarity magnetic edges 844, 846. The positive-polarity magnetic blades 830, 832 may be spaced between the negative-polarity magnetic blades 834, 836 such that the blades alternate radially between positive-polarity magnetic blade and negative-polarity magnetic blade. As the rotor 812 rotates, each magnetic blade will rotate into and through proximity with the first sensor 820 in turn. The first sensor 820 will have an opposing polarity to each magnetic blade as each magnetic blade rotates into proximity with the first sensor 820 because each positive magnetic blade 830, 832 is proceeded by negative magnetic blade 834, 836, and vice versa. As a result, each proceeding magnetic blade may reverse the polarity of the first sensor 820 to oppose the magnetization of the following magnetic blade.

In addition to the first sensor 820 and the second sensor 822 discussed with reference to FIG. 8B, a third sensor 824 and a fourth sensor 826 may be disposed within the stator 810. The first and second sensors 820, 822 may be disposed on the stator 810 radially opposite one another and the third and fourth sensors 824, 826 may be disposed on the stator 810 radially opposite one another, such that the sensors are spaced radially 90° from each other. The magnetic blades may also be spaced 90° from each other. As such, each magnetic blade may reverse the polarity of a sensor at approximately the same time, causing each sensor to generate a signal voltage. Thus, the additional sensors may provide added layers of redundancy that may be desired to check for errors. In addition, the redundant sensor configuration may allow the measurement system to continue operating after a sensor malfunctions or a magnetic edge loses magnetization.

Figure 9:
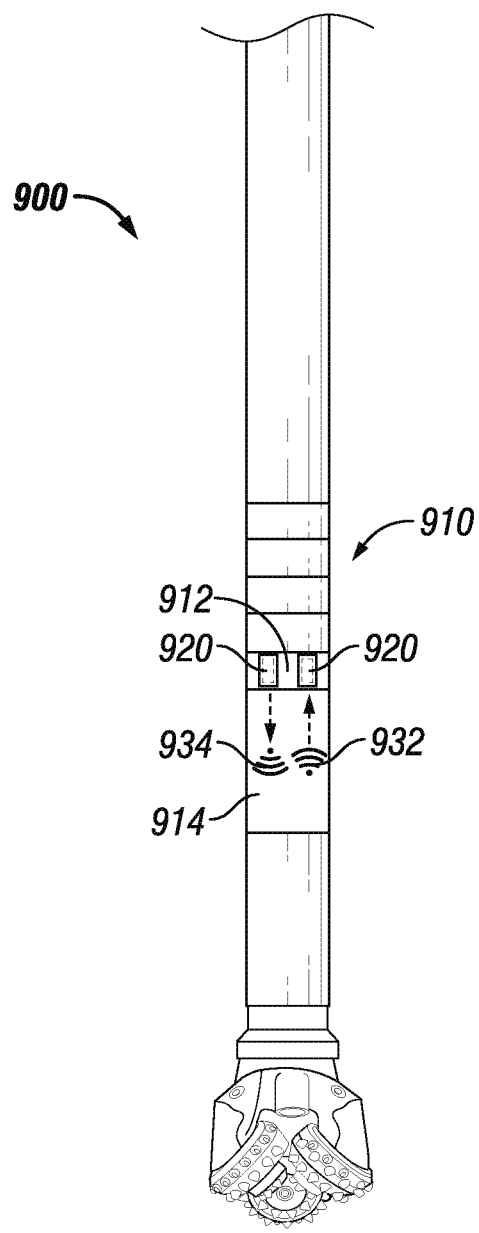
FIG. 9 is a diagram of a downhole communication system, according to aspects of the present disclosure.

Referring now to FIG. 9, at least one sensor 920 may be disposed in the turbine section 910 of the downhole assembly 900. The at least one sensor 920 may be disposed within the last turbine stage 912, which is closest to an electronics package 914 that contains a transmitter 932 and a receiver 934. The electronics package 914 may further comprise other electronics, including at least one battery, processor, controller, or storage. In response to a generated voltage signal from a reverse of polarity, the at least one sensor 920 may transmit a sensor signal to the receiver 934. The transmitter 932 may then relay the signal to a surface receiver or another tool located uphole.

Consistent with the present disclosure, the sensor signal generated by the sensor 620 may be used to measure the rotational speed of a motor rotor blade during operation by detecting a passing magnetized rotor blade. The sensor may send the sensor signal without external power. Both the sensor and the rotor magnetic edge may withstand and be operational in temperatures of from −100° C. to 350° C.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A drilling apparatus, comprising:
   a stator;
   a rotor rotatably disposed within the stator, wherein the rotor comprises at least one magnetic blade, wherein the at least one magnetic blade comprises a magnetic edge, wherein the rotor is configured to be disposed circumferentially about a drive shaft; and
   a sensor disposed within the stator and adjacent to the rotor, wherein the sensor is disposed to detect passing of the magnetic edge.

2. The apparatus of claim 1, wherein the magnetic edge comprises a magnetic film.

3. The apparatus of claim 1, wherein the sensor comprises a Wiegand effect sensor.

4. The apparatus of claim 3, wherein the sensor comprises an annealed ferromagnetic wire.

5. The apparatus of claim 1, further comprising a sensor circuit coupled to the sensor, wherein the sensor circuit transmits a signal associated with a reverse in the magnetization of the sensor.

6. The apparatus of claim 5, further comprising a receiver for receiving the signal.

7. The apparatus of claim 1, wherein the magnetic blade comprises a plurality of magnetic blades, and wherein the rotor comprises a positive-polarity magnetic film associated with a first magnetic blade of the plurality of magnetic blades and a negative-polarity magnetic film associated with a second magnetic blade of the plurality of magnetic blades.

8. The apparatus of claim 7, wherein the first magnetic blade comprises a positive-polarity magnetic film and the second magnetic blade comprises a negative-polarity magnetic film such that a polarity of the sensor is reversed.

9. The apparatus of claim 1, further comprising a second sensor disposed within the stator and adjacent to the rotor, wherein the sensor and the second sensor are spaced at least 45 degrees apart on the stator.

10. A drilling system, comprising:
    a rotor coupled to a drive shaft and capable of rotating the drive shaft, wherein the rotor comprises at least one magnetic blade comprising a magnetic edge, wherein the rotor is configured to be disposed circumferentially about the drive shaft; and
    a sensor disposed adjacent the rotor, wherein the at least one magnetic blade reverses a magnetization of the sensor.

11. The drilling system of claim 10, further comprising a stator, wherein the rotor is rotatably disposed within the stator, and wherein the sensor is disposed within the stator.

12. The drilling system of claim 10, wherein the magnetic edge comprises a magnetic film.

13. The drilling system of claim 10, further comprising a second sensor disposed adjacent to the rotor and separated from the sensor along a perimeter of the stator by at least 45 degrees.

14. The drilling system of claim 10, further comprising a sensor circuit coupled to the sensor, wherein the sensor circuit transmits a signal in response to a reverse in magnetization of the sensor.

15. The drilling system of claim 10, wherein the sensor comprises a Wiegand effect sensor.

16. A method, comprising:
    providing a rotor comprising a magnetic rotor, wherein the rotor is configured to be disposed circumferentially about a drive shaft;
    rotating the magnetic rotor into proximity with a sensor;
    reversing the magnetization of the sensor with the magnetic rotor;
    transmitting a signal in response to a reversal of magnetization of the sensor; and
    determining at least one rotor property from the signal.

17. The method of claim 16, wherein determining at least one rotor property comprises determining a rotation speed of the rotor.

18. The method of claim 16, wherein rotating the magnetic rotor comprises rotating the drive shaft and a drill bit connected to the drive shaft.

19. The method of claim 16, wherein reversing the magnetization of the sensor comprises alternately reversing the polarity of the sensor from a positive polarity to a negative polarity.

20. The method of claim 16, wherein the sensor comprises a Wiegand effect sensor.

\* \* \* \* \*